(12) United States Patent
Lesea

(10) Patent No.: US 9,935,733 B1
(45) Date of Patent: Apr. 3, 2018

(54) METHOD OF AND CIRCUIT FOR ENABLING A COMMUNICATION CHANNEL

(71) Applicant: Xilinx, Inc., San Jose, CA (US)

(72) Inventor: Austin H. Lesea, Los Gatos, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 15/270,384

(22) Filed: Sep. 20, 2016

(51) Int. Cl.
*H04L 27/28* (2006.01)
*H04L 1/00* (2006.01)
*H04L 27/34* (2006.01)
*H04L 25/49* (2006.01)

(52) U.S. Cl.
CPC ........ *H04L 1/0003* (2013.01); *H04L 25/4917* (2013.01); *H04L 27/3405* (2013.01)

(58) Field of Classification Search
CPC H04L 1/0003; H04L 25/4917; H04L 27/3405
USPC ........................................................ 375/261
See application file for complete search history.

(56) References Cited

U.S. PATENT DOCUMENTS

| | | | |
|---|---|---|---|
| 7,440,495 B1 | 10/2008 | Hagen | |
| 7,505,542 B1 | 3/2009 | Lesea | |
| 7,813,262 B1 | 10/2010 | Rao | |
| 8,090,037 B1 | 1/2012 | Harris et al. | |
| 8,270,335 B1 | 9/2012 | Logue | |
| 8,649,307 B1 | 2/2014 | Dick | |
| 8,711,888 B2 * | 4/2014 | Bar-Sade | H04L 1/0002 370/538 |
| 8,913,692 B1 | 12/2014 | Copeland | |
| 9,178,552 B1 | 11/2015 | Satarzadeh et al. | |
| 2007/0153726 A1 * | 7/2007 | Bar-Sade | H04L 1/0002 370/329 |
| 2008/0279303 A1 * | 11/2008 | Wengerter | H04L 1/0003 375/295 |
| 2008/0311852 A1 * | 12/2008 | Hansen | H04W 88/06 455/41.2 |
| 2010/0165957 A1 * | 7/2010 | Hegde | H04W 88/10 370/338 |
| 2011/0228864 A1 * | 9/2011 | Aryanfar | H04L 25/0272 375/259 |
| 2015/0146816 A1 * | 5/2015 | Hollis | G06F 13/38 375/288 |

* cited by examiner

*Primary Examiner* — Helene Tayong
(74) *Attorney, Agent, or Firm* — John J. King

(57) ABSTRACT

A method of enabling a communication channel between a first communication circuit and a second communication circuit is described. The method comprises establishing a communication link according to a communication protocol between the first communication circuit and the second communication circuit, wherein the communication protocol enables the transmission of data between the first communication circuit and the second communication circuit at a standardized data rate; determining a standardized data rate for which the communication link between the first communication circuit and the second communication circuit fails to meet a predetermined quality threshold; and establishing a communication link according to the communication protocol at a non-standardized data rate below the determined standardized data rate.

20 Claims, 9 Drawing Sheets

METHOD OF AND CIRCUIT FOR ENABLING A COMMUNICATION CHANNEL

TECHNICAL FIELD

The present invention relates generally to communication devices, and in particular, to a method of and circuit for enabling a communication channel.

BACKGROUND

Data transmission is an important aspect of computer networks and many other electronic devices such as integrated circuits. One important property of data transmission is the speed of data transmission. It is generally beneficial to transmit data at the fastest rate possible while still maintaining an acceptable data transmission error rate. Data is often transmitted according to various protocols. These protocols may be defined by specific standards established by various standards bodies, such as the Institute of Electrical and Electronic Engineers (IEEE), for example, or other standards bodies. Standards are generally beneficial because they ensure that any element of the data transmission network will be able to successfully transmit transit data to or received dated from another element of the data transmission network.

However, standards often restrict the options of a user of the data transmission network. For example, a given standard may have a limited number of data transmission rates at which to transmit the data according to the standard. Such a limited number of data transmission rates may cause the data to be transmitted at a lower rate than would otherwise be possible. That is, while data transmitted at a certain rate may lead to too many errors, data transmitted at the next lower rate available according to the data protocol may be slower than otherwise possible while meeting an acceptable data transmission error rate.

Accordingly, circuits and methods that enable transmitting data at a rate not available according to a standard are desired.

SUMMARY

A method of enabling a communication channel between a first communication circuit and a second communication circuit is described. The method comprises establishing a communication link according to a communication protocol between the first communication circuit and the second communication circuit, wherein the communication protocol enables the transmission of data between the first communication circuit and the second communication circuit at a standardized data rate; determining a standardized data rate for which the communication link between the first communication circuit and the second communication circuit fails to meet a predetermined quality threshold; and establishing a communication link according to the communication protocol at a non-standardized data rate below the determined standardized data rate.

A circuit for enabling a communication channel between a first communication circuit and a second communication circuit is described. The circuit comprises a control circuit configured to establish a communication link according to a communication protocol between a first communication circuit and a second communication circuit, wherein the communication protocol enables the transmission of data between the first communication circuit and the second communication circuit at a standardized data rate; and an error detection circuit coupled to the control circuit, wherein the error detection circuit determines a standardized data rate according to the communication protocol for which the communication link between the first communication channel and the second communication channel fails to meet a predetermined quality threshold; wherein the control circuit establishes a communication link at a non-standardized data rate below the determined standardized data rate.

Other features will be recognized from consideration of the Detailed Description and the Claims, which follow.

DETAILED DESCRIPTION

While the specification includes claims defining the features of one or more implementations of the invention that are regarded as novel, it is believed that the circuits and methods will be better understood from a consideration of the description in conjunction with the drawings. While various circuits and methods are disclosed, it is to be understood that the circuits and methods are merely exemplary of the inventive arrangements, which can be embodied in various forms. Therefore, specific structural and functional details disclosed within this specification are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting, but rather to provide an understandable description of the circuits and methods.

The circuits and methods enable the selection of a faster data rate for the transmission of data in a communication channel, and more particularly, the transmission of data at a data rate that is a non-standardized data rate below a first standardized data rate (of a plurality of standardized data rates) that exceeds a predetermined error rate for the channel. By way of example, a method of enabling a communication channel between a first communication circuit and a second communication circuit comprises establishing a communication link according to a communication protocol between a first communication circuit and a second communication circuit, wherein the communication protocol enables the transmission of data between the first communication circuit and the second communication circuit at a standardized data rate; determining a standardized data rate for which the communication link between the first communication channel and the second communication channel fails to meet a predetermined quality threshold; and establishing a communication link at a non-standardized data rate below the standardized data rate. A standardized data rate may not necessarily be defined by a specific date rate that is commonly used for a given protocol. As will be described in more detail below, a non-standard data rate may be any data rate that is not agreed upon in advance as a data rate for transmitting date between the transmitter and receiver, but a data rate selected by one of the transmitter or receiver and communicated to the other of the transmitter or receiver. It should be noted that the circuits and methods set forth below could be implemented with any circuit elements transmitting data in any system and through any data communication medium, including electrical of free space channel, including wired, wireless or optical channels.

Figure 1:
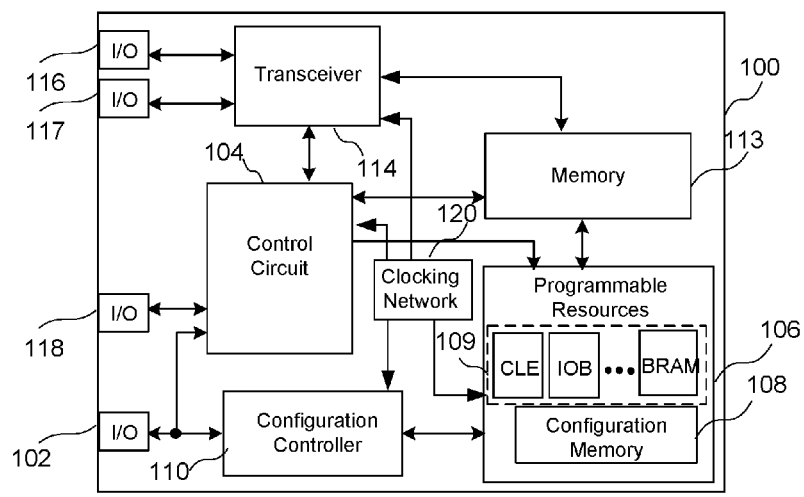
FIG. 1 is a block diagram of a circuit enabling the transmission of data.

Turning first to FIG. 1, a block diagram of a circuit enabling the transmission of data is shown. In particular, an input/output port 102 is coupled to a control circuit 104 that controls programmable resources 106 having configurable logic elements 109. Configuration data may be provided to the configuration memory 108 by a configuration controller 110. The configuration data enables the operation of the programmable resources 106. A memory 113 may be coupled to the control circuit 104 and the programmable resources 106. A transceiver circuit 114 may be coupled to the control circuit 104, programmable resources 106 and the memory 113, and may receive signals at the integrated circuit by way of I/O ports 116 and 117. Other I/O ports may be coupled to circuits of the integrated circuit device, such as I/O port 118 that is coupled to the control circuit 104 as shown. A clocking network 120 is coupled to various elements of the circuit of FIG. 1. The circuits and methods as described in more detail below could be implemented to enable the transmission of data, for example.

Figure 2:
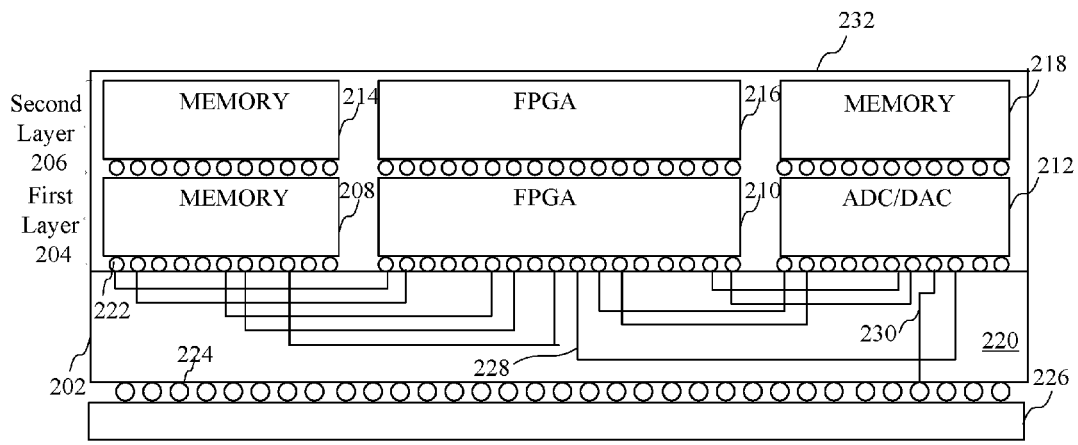
FIG. 2 is a cross-sectional view of a multi-die integrated circuit device.

Turning now to FIG. 2, a cross-sectional view of a multi-die integrated circuit device is shown. As shown in FIG. 2, a packaged integrated circuit 202 comprising a multi-die integrated circuit may include a plurality of layers of die. By way of example, the packaged integrated circuit 202 may include a first layer 204 having a first plurality of die and a second layer 206 having a second plurality of die. The first layer 204 may comprise a memory die 208, and FPGA die 210, and an analog-to-digital/digital-to-analog (ADC/DAC) die 212. Similarly, the second layer 206 may comprise a memory die 214, and FPGA die 216, and an ADC/DAC die 218. A substrate 220 configured to receive the first layer 204 of die comprise a plurality of interconnect elements that are coupled to contact elements 222, such as bond bumps, and enable a connection by way of contact elements 224, such as solder balls, to enable a connection to a circuit board 226. Alternatively, the die could be implemented on an interposer coupled to the substrate, where the interpose includes the interconnect elements. The interconnect elements may comprise metal traces 228 that enable the connection between two die or metal traces 230 that enable the connection between a contact element 222 and a contact element 224.

As will be described in more detail below, the circuits and methods can enable the transmission of data at a data rate that is a non-standardized data rate below a first standardized data rate (of a plurality of standardized data rates) that exceeds a predetermined error rate for the channel between die of the integrated circuit package 202 or between the integrated circuit package 202 and some other device by way of the circuit board. That is, the circuits and methods enable an efficient method of transmitting data chip-to-chip, chip-to-interposer, chip-to-board, and chip-to-backplane electrical interfaces, for example, where solder bumps, solder balls and interconnect elements enable a communication link between die of the IC device or other devices coupled to the IC device. The arrangement of die on the integrated circuit package 202 is provided by way of example. It should be understood that other arrangements of die, including other types and combinations of functional circuits implemented on the die, can be implemented.

Figure 3:
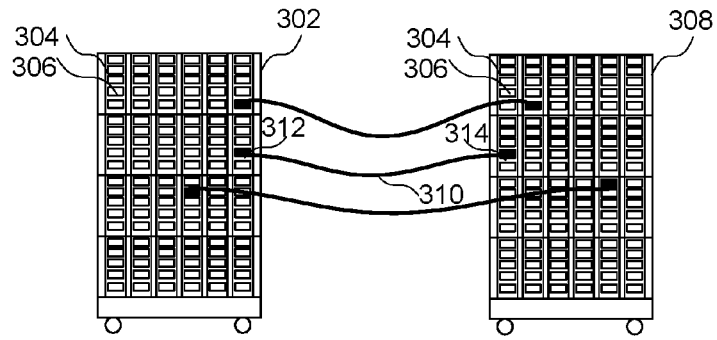
FIG. 3 is a diagram showing a rack of computers communicating with another rack of computers by way of communication links.

Turning now to FIG. 3, a diagram shows a rack of computers communicating with another rack of computers by way of communication links. According to another implementation, data can be transmitted at a selected rate between racks of computers, such as a computer 304 having a plurality of connectors 306 to a second rack of computers 308. A communication link can be provided by a cable 310 coupled to a first connector 312 of the first rack 302 and a second connector 314 of the second rack 308. The arrangement of FIG. 3 is provided by way of example. However, it should be understood that the transmission of data can be between any electronic circuits implemented in various electronic devices and connected by way of any communication link including wired, wireless, or optical communication links, or any other type of communication link.

Figure 4:
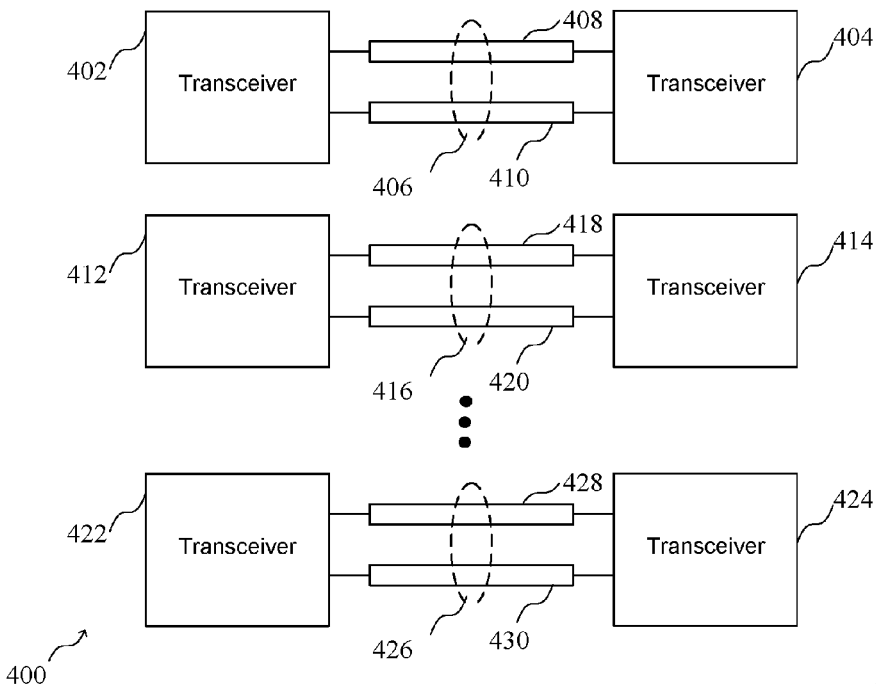
FIG. 4 is a block diagram showing a plurality of transceivers enabling a plurality of communication links.

Turning now to FIG. 4, a block diagram shows a plurality of transceivers enabling a plurality of communication links. A data transmission system 400 comprises a plurality of pairs of data transceivers, including a first data transceiver 402 coupled to a second date transceiver 404 by way of a pair of transmission lines 406 including a first transmission line 408 enabling the transmission of data from transceiver 402 to transceiver 404, and a second transmission line 410 and enabling the transmission of data from transceiver 404 to transceiver 402. Similarly, in a second pair of transceivers, a first data transceiver 412 coupled to a second date transceiver 414 by way of a pair of transmission lines 416 including a first transmission line 418 enabling the transmission of data from transceiver 412 to transceiver 414, and a second transmission line 420 and enabling the transmission of data from transceiver 414 to transceiver 412. In a third pair of data transceivers, a first data transceiver 422 coupled to a second date transceiver 424 by way of a pair of transmission lines 426 including a first transmission line 428 enabling the transmission of data from transceiver 422 to transceiver 424, and a second transmission line 430 and enabling the transmission of data from transceiver 424 to transceiver 422. The data transmission system 400 could be implemented in any of the configurations of FIG. 2 or 3 to enable the transmission of data as described, for example, or in any other configuration of circuit elements enabling the transmission of data in any type of data transmission system.

Figure 5:
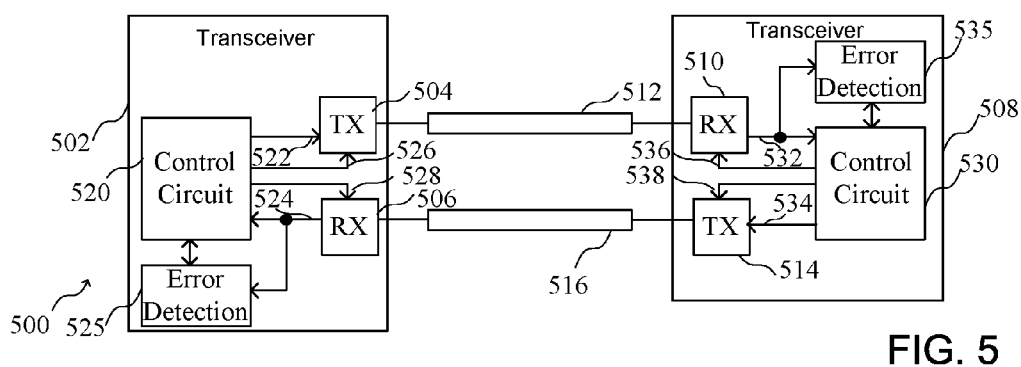
FIG. 5 is a block diagram showing a pair of transceivers enabling a communication link.

Turning now to FIG. 5, a block diagram shows a pair of transceivers enabling a communication link. As shown in FIG. 5, a data communication channel 500 comprises a first transceiver 502 having a transmitter 504 and a receiver 506 is coupled to a second transceiver 508. Data is transmitted from the transmitter 504 to a receiver 510 of the transceiver 508 by way of a transmission line 512. Similarly, a transmitter 514 of the transceiver 508 enables the transmission of data to the receiver 506 by way of a communication link comprising a transmission line 516.

The transceivers 502 and 508 comprise control circuits and error detection circuits to enable controlling the data transmission rates of the transceivers. More particularly, the transceiver 504 comprise a control circuit 520 providing data by way of a first data connection 522 to transceiver 504. Similarly, the control circuit 520 receives data by way of a second data connection 524 from the receiver 506. An error detection circuit 525 is configured to determine an error rate of the received data. Depending upon the error rate, the control circuit will control the transmission rate of the transmitter 504 by way of a control line 526, and control the receiver rate of the receiver 506 by way of a control line 528. The transceiver 508 comprise a control circuit 530 enabling the transmission of data by way of a data connection 516 to receiver 506. Similarly, the control circuit 530 receives data by way of a data connection 512 from the receiver 510 on a data connection 532, and provides data to be transmitted to the transmitter 514 on a data connection 534. The control circuit comprises an error detection circuit 535 configured to determine an error rate of the received data. Depending upon the error rate, the control circuit will control the transmission rate of the transmitter 514 by way of a control line 538, and control the receiver rate of the receiver 510 by way of a control line 536. While two control circuits are shown, only one circuit may be needed as the forward and reverse channels are likely to have the same channel quality. Also, the channel quality can be periodically checked to determine whether to change the transmission protocol again. Although transceivers having both a transmitter and a receiver are shown, it should be understood that the circuits and methods could be implemented with separate transmitters and receivers.

Figure 6:
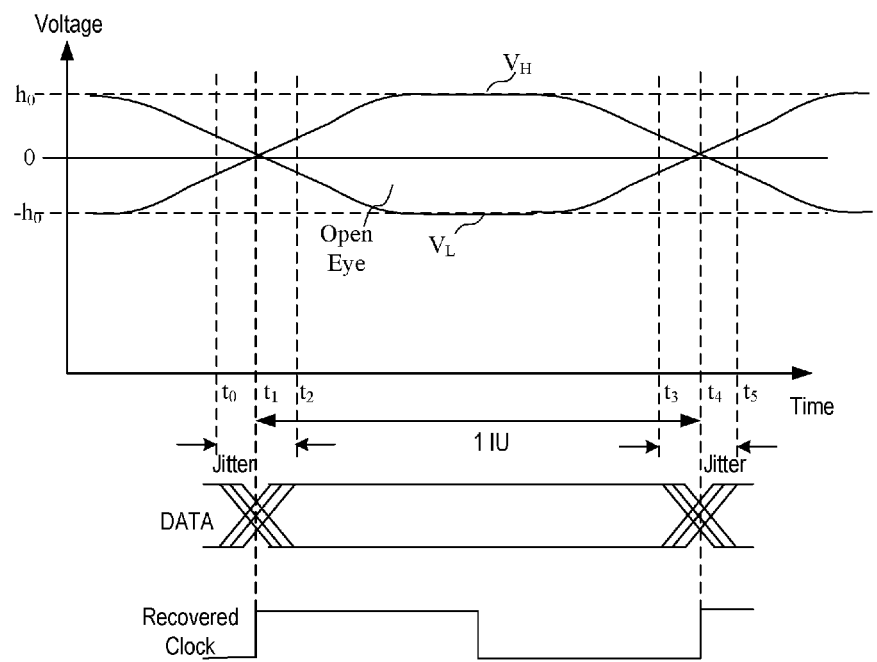
FIG. 6 is a diagram showing the transmission of NRZ data.

Turning now to FIG. 6, a diagram shows the transmission of NRZ data. Before describing a circuit for transmitting data, it is helpful to describe an eye diagram associated with transmitted data. The eye diagram of FIG. 6 shows a non-return to zero (NRZ) pattern associated with data. A generated AC signal is typically defined by an "eye pattern," where it is desirable to have a large "open eye" portion so that a detected value at a given time in the middle of the eye pattern (i.e. between jitter on either ends of the eye pattern) can easily be detected as being associated with an expected voltage at the top or bottom of the eye pattern. The received data signal of FIG. 6 represents an NRZ input signal that is symmetrical about zero volts, where the expected value at the top of the eye pattern (i.e. a logical "1") is represented by $h_0$, and the expected value at the bottom of the eye pattern (i.e. a logical "0") is represented by $-h_0$. The beginning of the unit interval (i.e. the period between time $t_1$ and $t_4$) of the received data is at time $t_1$, where jitter may generally be detected between $t_0$ and $t_2$. The data is preferably detected at the center of the eye pattern (shown by the falling edge of the recovered clock signal approximately half way between $t_2$ and $t_3$), where jitter can be expected to be received in another jitter period between $t_3$ and $t_5$. It should be noted that the positive and negative valves are relative voltages depending upon how the nodes of the circuit are probed, where the nodes are probed differentially. While the eye pattern of FIG. 6 represents an ideal eye pattern, where the voltage level $V_H$ detected at the top of the eye pattern has a positive voltage value of $h_0$, and the voltage level $V_L$ detected at the bottom of the eye pattern has a negative voltage value of $-h_0$, it should be noted that the typical eye pattern for received data over time varies. Therefore, the sharp line representing the eye pattern would be shown by a much wider pattern representing variations in the detected values over time.

Figure 7:
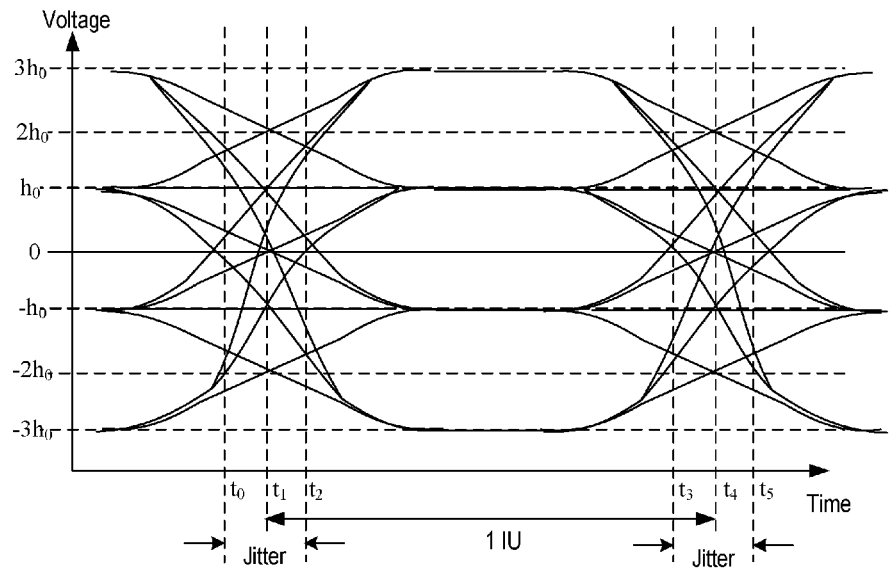
FIG. 7 is a diagram showing the transmission of PAM4 data.

Turning now to FIG. 7, a diagram shows the transmission of pulse amplitude modulation (PAM) data, and particularly PAM4 data. More particularly, the diagram of FIG. 7 shows received data signals according to a PAM4 protocol, where the received voltage of the signal may have a value of $-3h_0$, $-h_0$, $h_0$ or $3h_0$. According to the PAM4 protocol, a single value can be used to generate two bits of data, where $-3h_0$ may be represent 00, $-h_0$ may represent 01, $h_0$ may represent 10, and $3h_0$ may represent 11.

In order to determine the appropriate value of a reference voltage to provide for a comparison with a detected value when implementing the PAM4 protocol, a level detection circuit determines in which of 4 possible ranges the detected voltage falls, and compares the detected value to a predetermined value associated with one of the 4 possible ranges. In particular, if a detected value of the input signal is determined to be greater than $+2h_0$, then the $+3h_0$ voltage value will be used as the reference value input to an error detector. If a detected value of the input signal is determined to be between 0 and $+2h_0$, then the $+h_0$ voltage value will be used as the reference value input to the error detector. If a detected value of the input signal is determined to be between 0 and $-2h_0$, then the $-h_0$ voltage value will be used as the reference value input to the error detector. Finally, if a detected value of the input signal is determined to be less than $-2h_0$, then the $-3h_0$ voltage value will be used as the reference value input to the error detector.

Figure 8:
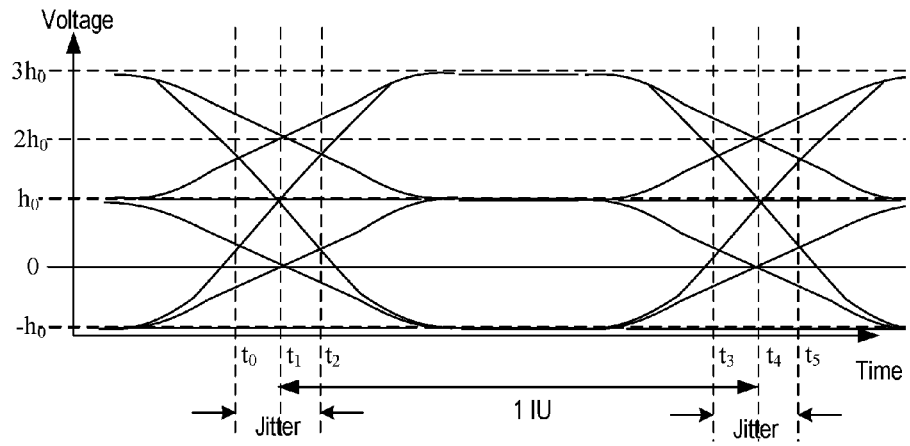
FIG. 8 is a diagram showing the transmission of PAM3 data

Turning now to FIG. 8, a diagram shows the transmission of PAM3 data. As shown in FIG. 8, the number of voltage levels for receiving data in a given range of voltages is reduced, ensuring the data can be received and meet a predetermined error rate. That is, 3 signal levels can be received in the voltage range of $-h_0$ and $3h_0$ as shown in FIG. 8, which would generally correspond to the voltage range of $-3h_0$ to $3h_0$ of FIG. 7. It should be noted that, while conventional devices transmit data according to standardized NRZ or PAM4 protocols, conventional devices do not transmit data according to a PAM3 protocol, which is a non-standardized data format. Accordingly, the circuits and methods enable the transmission of data at a PAM3 protocol data rate if transmitting data at a PAM4 data rate has an error rate exceeding a predetermined value, rather than revert to an NRZ protocol. That is, one or both of the control circuits 520 and 530 would decide to implement data communication according to the data protocol at a non-standardized data rate, which may be a data rate that not included as a part of a protocol for which a standard applies, or a data rate that is not agreed upon between the transmitter and receiver, but decided on by a control circuit of the transmitter or receiver. The circuits which enable the changing of a data rate from a standardized data rate to a non-standardized data rate may be implemented in a programmable logic device (PLD), as will be described in more detail in reference to FIGS. 15-17.

Figure 9:
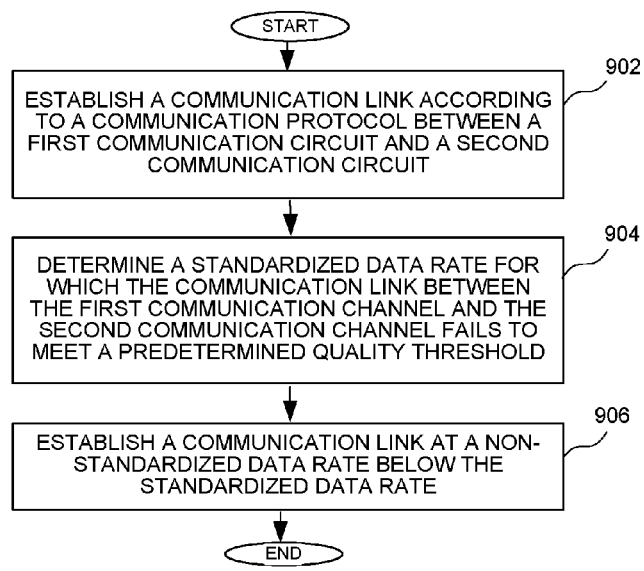
FIG. 9 is a flow chart showing a method of enabling a communication channel.

Turning now to FIG. 9, a flow chart shows a method of enabling a communication channel. In particular, a communication link according to a communication protocol is established between a first communication circuit and a second communication circuit at block 902. The communication protocol enables the transmission of data between the first communication circuit and the second communication circuit at a standardized data rate. A standardized data rate for which the communication link between the first communication channel and the second communication channel fails to meet a predetermined quality threshold is determined at a block 904. A communication link at a non-standardized data rate below the standardized data rate is established at a block 904. The method of FIG. 9 could be implemented using any of the circuits of FIGS. 1-5, and implementing any data transmission protocol. It should also be understood that the determination of an appropriate protocol for a data communication channel can be periodically updated. That is, after the channel is initially established, the quality of the channel can be periodically checked to determine whether it would be possible to transmit the data at a greater data rate.

By way of example, data may be initially transmitted according to an NRZ protocol. A sync signal is sent and retried until an adequate response is received. The same initial test can be performed on the reverse channel (i.e. from the transceiver receiving the data to the transceiver initially sending the data). All DAC states may be initially sent (e.g. 0, 2, 4, 8: 8, 4, 2, 0) and then repeated a predetermined number of times. The control circuit on the receiver end may create a dictionary of ideal sent values versus actual received values. The communication link would then be tested with new values according to a PAM4 protocol. If the data rate is too high, the control circuits of the channel will revert to PAM3 for example. That is, PAM3 is not a pulse amplitude modulation transmission that is defined by a standard, or is a pulse amplitude modulation transmission that is not agreed upon in advance as a data rate for transmitting data between the transmitter and the receiver. After determining that a bit error rate is acceptable, a link up/down with format speed is established and maintained until a bit error rate is determined to be too high. The bit error rate can be periodically checked to determine whether the data rate should be changed.

Figure 10:
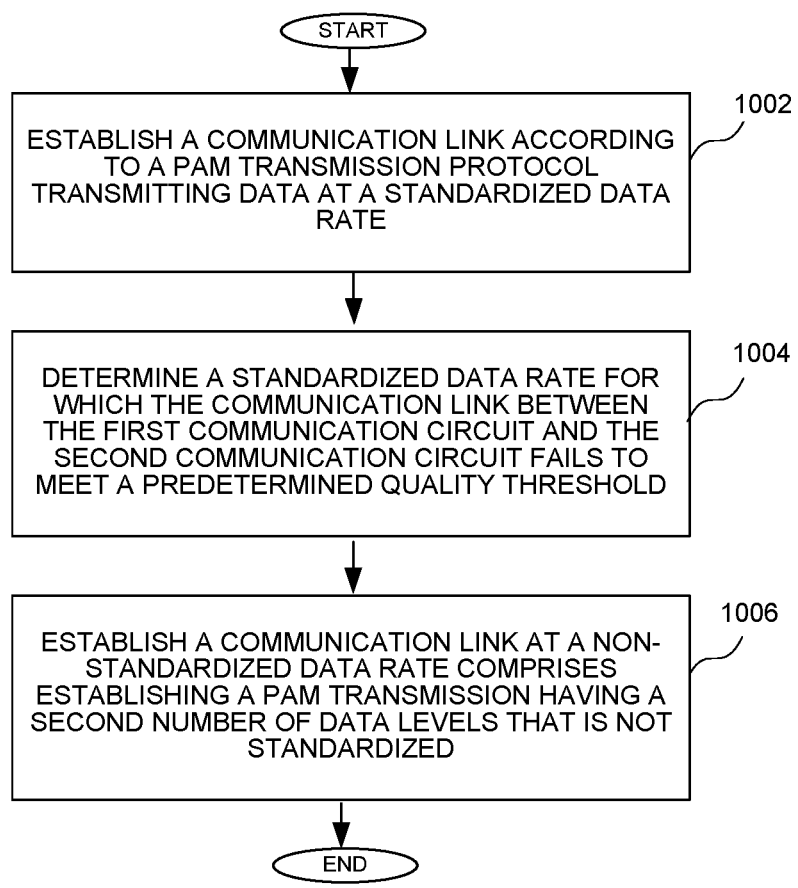
FIG. 10 is a flow chart showing a method of enabling a communication channel according to a PAM protocol.

Turning now to FIG. 10, a flow chart shows a method of enabling a communication channel according to a PAM protocol. A communication link according to a communication protocol transmitting data at a standardized data rate comprises establishing a PAM transmission having a first number of data levels for transmitting data is established at a block 1002. By way of example, a communication channel that is a PAM4 channel can be established. A standardized data rate for which the communication link between the first communication circuit and the second communication circuit fails to meet a predetermined quality threshold is determined rate at a block 1004. For example, determining whether data transmitted by the standardized data rate fails to meet a quality threshold may be based upon a predetermined bit error. A communication link at a non-standardized data rate comprising a PAM transmission having a second number of data levels for transmitting data that is not a multiple of four is established at a block 1006. For example, if it were determined that a standardized PAM8 data transmission does not meet a predetermined error rate, the circuit may establish a communication link transmitting data at a non-standardized PAM5, PAM6, or PAM7 data rate. That is, the PAM5, PAM6, and PAM7 data rates are not standard data rates, but rather non-standard data rates that are decided by a control circuit of the transmitter or receiver.

Figure 11:
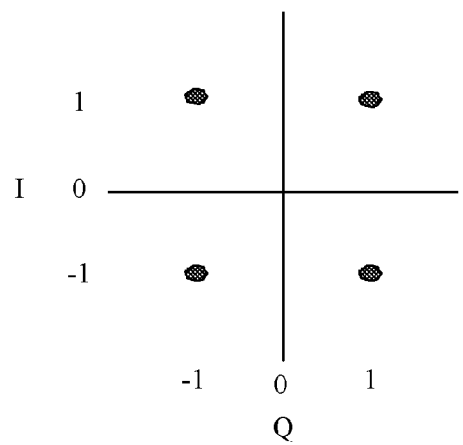
FIG. 11 is a diagram showing a first standard quadrature amplitude modulation (QAM) protocol for data transmission.
Figure 12:
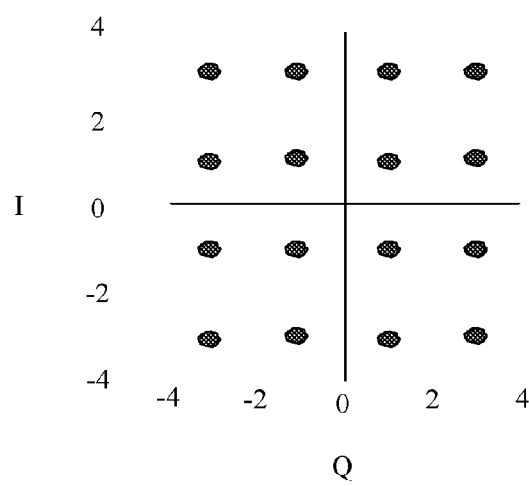
FIG. 12 is a diagram showing a second standard QAM protocol for data transmission.
Figure 13:
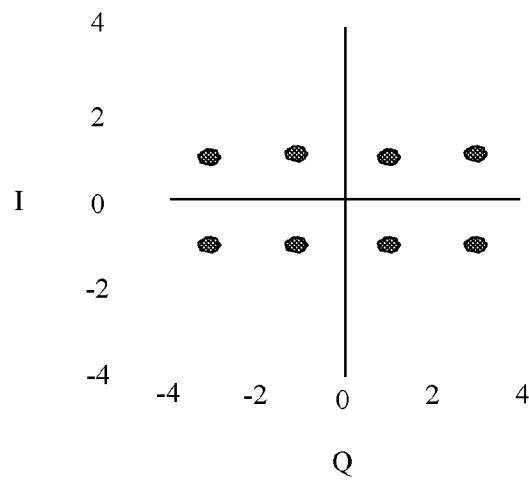
FIG. 13 is a diagram showing a non-standard QAM protocol for data transmission.

Turning now to FIGS. 11-13 is a diagram showing a first standard QAM protocol for data transmission. Each of FIGS. 11 and 12 show an equal number of rows and columns of data points according the standardized QAM protocols of data transmission. However, FIG. 13 shows a non-standardized QAM protocol of data transmission having an unequal number of rows and columns of data point in each of the four quadrants. That is, while various QAM protocols may be implemented having data points in an unequal number of rows and columns, the QAM protocol of FIG. 13 is not a standardized protocol according to a certain application of the QAM protocol, such as the transmission of data of digital TV, for example, or an agreed upon protocol between a transmitter and receiver. Rather, the QAM protocol of FIG. 13 is selected by one of a transmitter or receiver associated with a communication channel, and transmitted to the other of the transmitter or receiver. Although described in the I plane only (amplitude), the methods is extendable to the Q plane (phase) which then covers any IQ (nQAM) modulation/demodulation scheme.

Figure 14:
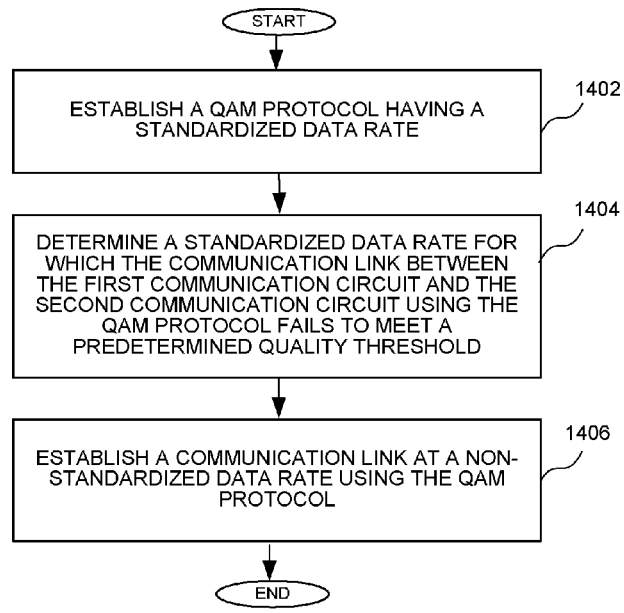
FIG. 14 is a flow chart showing a method of enabling a communication channel according to a QAM protocol.

Turning now to FIG. 14, a flow chart shows a method of enabling a communication channel according to a QAM protocol. A QAM protocol having a standardized data rate is established at a block 1402. A standardized data rate for which the communication link between the first communication circuit and the second communication circuit fails to meet a predetermined quality threshold is determined at block 1404, by determining whether data transmitted by the standardized data rate fails to meet a predetermined quality threshold can be established by determining a bit error rate. A communication link using the QAM protocol at a non-standardized data rate is established at a block 1406.

Figure 15:
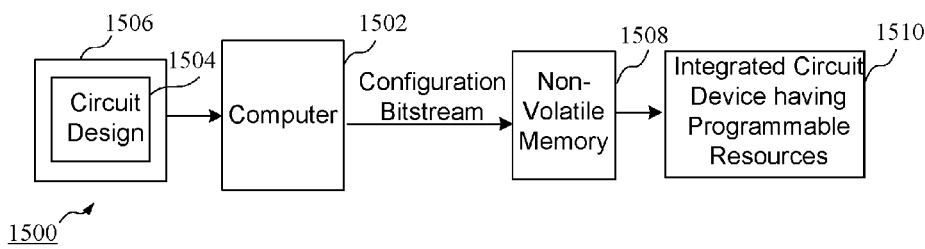
FIG. 15 is a block diagram of a system for programming a device having programmable resources.

Turning now to FIG. 15, a block diagram of a system for programming a device having programmable resources according to an implementation is shown. In particular, a computer 1502 is coupled to receive a circuit design 1504 from a memory 1506, and generates a configuration bitstream that is stored in the non-volatile memory 1508. As will be described in more detail below, the circuit design may be a high level design, such as a circuit design defined in a hardware description language (HDL). Also, the computer may be configured to run software that generates a configuration bitstream that is stored in the non-volatile memory 1508 and provided to an integrated circuit 1510, which may be a programmable integrated circuit, such as the integrated circuit described below in FIG. 16. As will be described in more detail below, bit of the configuration bitstream are used to configure programmable resources of the integrated circuit.

Figure 16:
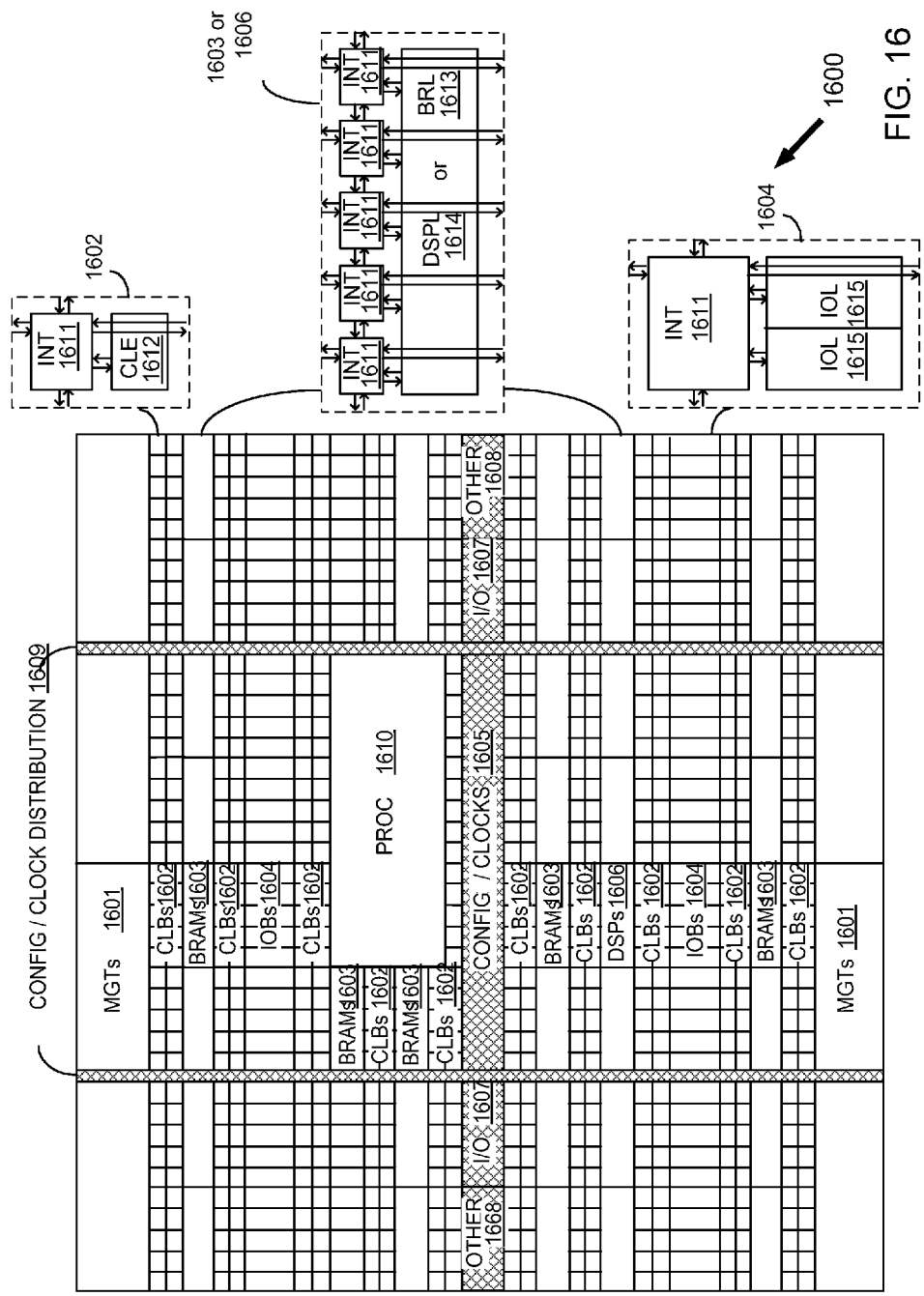
FIG. 16 is a block diagram of a device having programmable resources that may implement the circuits of FIGS. 1-5.

Turning now to FIG. 16, a block diagram of a device having programmable resources including the circuits of FIGS. 1-5 is shown. While devices having programmable resources may be implemented in any type of integrated circuit device, such as an application specific integrated circuit (ASIC) having programmable resources, other devices comprise dedicated programmable logic devices (PLDs). One type of PLD is the Complex Programmable Logic Device (CPLD). A CPLD includes two or more "function blocks" connected together and to input/output (I/O) resources by an interconnect switch matrix. Each function block of the CPLD includes a two-level AND/OR structure similar to that used in a Programmable Logic Array (PLA) or a Programmable Array Logic (PAL) device. Another type of PLD is a field programmable gate array (FPGA). In a typical FPGA, an array of configurable logic blocks (CLBs) is coupled to programmable input/output blocks (IOBs). The CLBs and IOBs are interconnected by a hierarchy of programmable routing resources. These CLBs, IOBs, and programmable routing resources are customized by loading a configuration bitstream, typically from off-chip memory, into configuration memory cells of the FPGA. For both of these types of programmable logic devices, the functionality of the device is controlled by configuration data bits of a configuration bitstream provided to the device for that purpose. The configuration data bits may be stored in volatile memory (e.g., static memory cells, as in FPGAs and some CPLDs), in non-volatile memory (e.g., Flash memory, as in some CPLDs), or in any other type of memory cell.

The device of FIG. 16 comprises an FPGA architecture 1600 having a large number of different programmable tiles including multi-gigabit transceivers (MGTs) 1601, CLBs 1602, random access memory blocks (BRAMs) 1603, input/output blocks (IOBs) 1604, configuration and clocking logic (CONFIG/CLOCKS) 1605, digital signal processing blocks (DSPs) 1606, specialized input/output blocks (I/O) 1607 (e.g., configuration ports and clock ports), and other programmable logic 1608 such as digital clock managers, analog-to-digital converters, system monitoring logic, and so forth. Some FPGAs also include dedicated processor blocks (PROC) 1610, which may be used to implement a software application, for example.

In some FPGAs, each programmable tile includes a programmable interconnect element (INT) 1611 having standardized connections to and from a corresponding interconnect element in each adjacent tile. Therefore, the programmable interconnect elements taken together implement the programmable interconnect structure for the illustrated FPGA. The programmable interconnect element 1611 also includes the connections to and from the programmable logic element within the same tile, as shown by the examples included at the top of FIG. 16.

For example, a CLB 1602 may include a configurable logic element (CLE) 1612 that may be programmed to implement user logic plus a single programmable interconnect element 1611. A BRAM 1603 may include a BRAM logic element (BRL) 1613 in addition to one or more programmable interconnect elements. The BRAM includes dedicated memory separate from the distributed RAM of a configuration logic block. Typically, the number of interconnect elements included in a tile depends on the height of the tile. In the pictured implementation, a BRAM tile has the same height as five CLBs, but other numbers may also be used. A DSP tile 906 may include a DSP logic element (DSPL) 1614 in addition to an appropriate number of programmable interconnect elements. An 10B 1604 may include, for example, two instances of an input/output logic element (IOL) 1615 in addition to one instance of the programmable interconnect element 1611. The location of connections of the device is controlled by configuration data bits of a configuration bitstream provided to the device for that purpose. The programmable interconnects, in response to bits of a configuration bitstream, enable connections comprising interconnect lines to be used to couple the various signals to the circuits implemented in programmable logic, or other circuits such as BRAMs or the processor.

In the pictured implementation, a columnar area near the center of the die is used for configuration, clock, and other control logic. The config/clock distribution regions 1609 extending from this column are used to distribute the clocks and configuration signals across the breadth of the FPGA. Some FPGAs utilizing the architecture illustrated in FIG. 16 include additional logic blocks that disrupt the regular columnar structure making up a large part of the FPGA. The additional logic blocks may be programmable blocks and/or dedicated logic. For example, the processor block PROC 1610 shown in FIG. 16 spans several columns of CLBs and BRAMs.

Note that FIG. 16 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 16 are purely exemplary. For example, in an actual FPGA more than one adjacent column of CLBs is typically included wherever the CLBs appear in order to facilitate the efficient implementation of user logic. While the implementation of FIG. 16 relates to an integrated circuit having programmable resources, it should be understood that the circuits and methods set forth in more detail below could be implemented in any type of ASIC.

Figure 17:
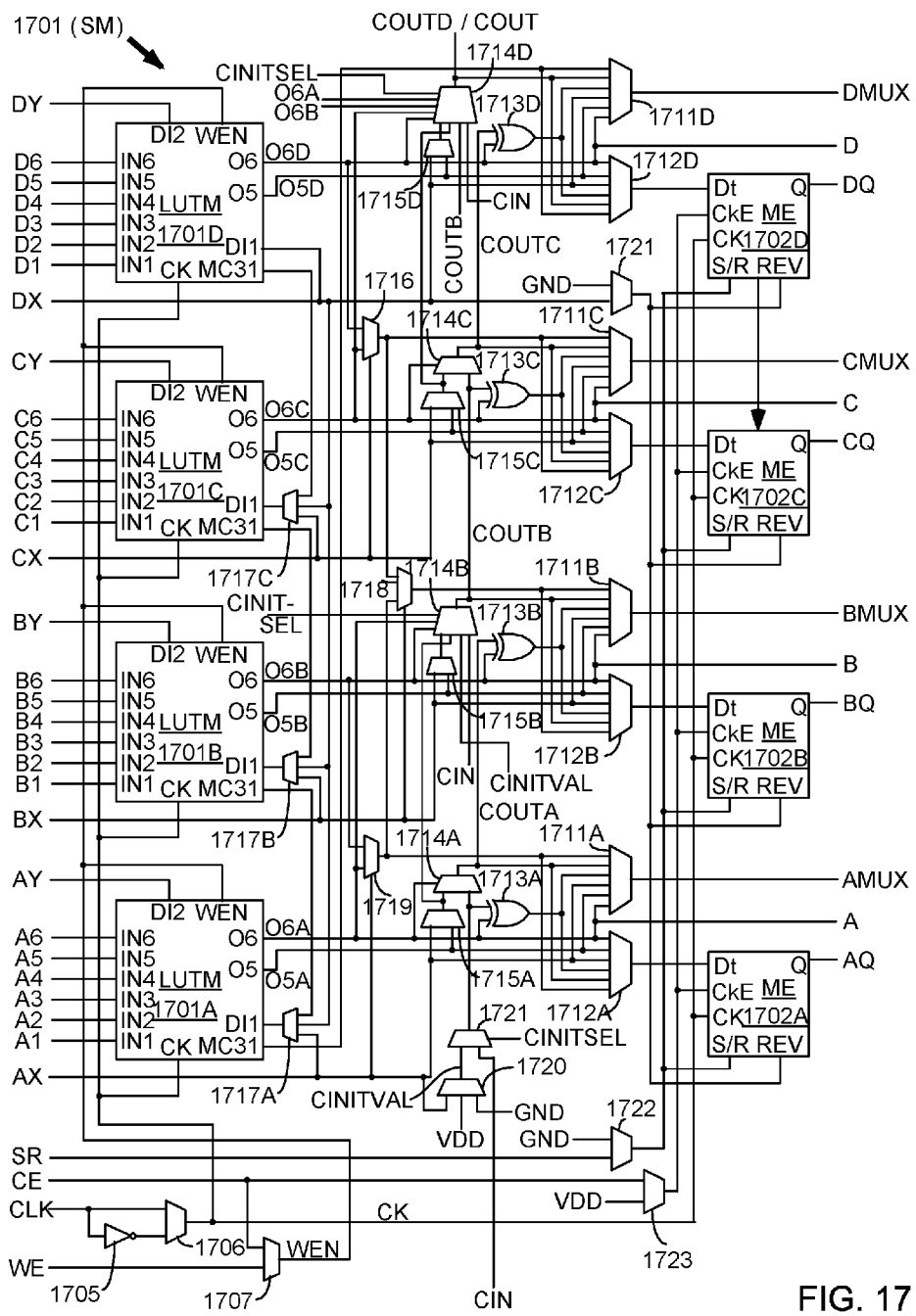
FIG. 17 is a block diagram of a configurable logic element of the device of FIG. 13.

Turning now to FIG. 17, block diagram of a configurable logic element of the device of FIG. 16 is shown. In particular, FIG. 17 illustrates in simplified form a configurable logic element of a configuration logic block 1602 of FIG. 16. In the implementation of FIG. 17, slice M 1701 includes four lookup tables (LUTMs) 1701A-1701D, each driven by six LUT data input terminals A1-A6, B1-B6, C1-C6, and D1-D6 and each providing two LUT output signals O5 and O6. The O6 output terminals from LUTs 1701A-1701D drive slice output terminals A-D, respectively. The LUT data input signals are supplied by the FPGA interconnect structure via input multiplexers, which may be implemented by programmable interconnect element 1711, and the LUT output signals are also supplied to the interconnect structure. Slice M also includes: output select multiplexers 1711A-1711D driving output terminals AMUX-DMUX; multiplexers 1712A-1712D driving the data input terminals of memory elements 1702A-1702D; combinational multiplexers 1716, 1718, and 1719; bounce multiplexer circuits 1722-1723; a circuit represented by inverter 1705 and multiplexer 1706 (which together provide an optional inversion on the input clock path); and carry logic having multiplexers 1714A-1714D, 1715A-1715D, 1720-1721 and exclusive OR gates 1713A-1713D. All of these elements are coupled together as shown in FIG. 17. Where select inputs are not shown for the multiplexers illustrated in FIG. 17, the select inputs are controlled by configuration memory cells. That is, configuration bits of the configuration bitstream stored in configuration memory cells are coupled to the select inputs of the multiplexers to select the correct inputs to the multiplexers. These configuration memory cells, which are well known, are omitted from FIG. 17 for clarity, as well as from other selected figures herein.

In the pictured implementation, each memory element 1702A-1702D may be programmed to function as a synchronous or asynchronous flip-flop or latch. The selection between synchronous and asynchronous functionality is made for all four memory elements in a slice by programming Sync/Asynch selection circuit 1703. When a memory element is programmed so that the S/R (set/reset) input signal provides a set function, the REV input terminal provides the reset function. When the memory element is programmed so that the S/R input signal provides a reset function, the REV input terminal provides the set function. Memory elements 1702A-1702D are clocked by a clock signal CK, which may be provided by a global clock network or by the interconnect structure, for example. Such programmable memory elements are well known in the art of FPGA design. Each memory element 1702A-1702D provides a registered output signal AQ-DQ to the interconnect structure. Because each LUT 1701A-1701D provides two output signals, O5 and O6, the LUT may be configured to function as two 5-input LUTs with five shared input signals (IN1-IN5), or as one 6-input LUT having input signals IN1-IN6.

In the implementation of FIG. 17, each LUTM 1701A-1701D may function in any of several modes. When in lookup table mode, each LUT has six data input signals IN1-IN6 that are supplied by the FPGA interconnect structure via input multiplexers. One of 64 data values is programmably selected from configuration memory cells based on the values of signals IN1-IN6. When in RAM mode, each LUT functions as a single 64-bit RAM or two 32-bit RAMs with shared addressing. The RAM write data is supplied to the 64-bit RAM via input terminal DI1 (via multiplexers 1717A-1717C for LUTs 1701A-1701C), or to the two 32-bit RAMs via input terminals DI1 and DI2. RAM write operations in the LUT RAMs are controlled by clock signal CK from multiplexer 1706 and by write enable signal WEN from multiplexer 1707, which may selectively pass either the clock enable signal CE or the write enable signal WE. In shift register mode, each LUT functions as two 16-bit shift registers, or with the two 16-bit shift registers coupled in series to create a single 32-bit shift register. The shift-in signals are provided via one or both of input terminals DI1 and DI2. The 16-bit and 32-bit shift out signals may be provided through the LUT output terminals, and the 32-bit shift out signal may also be provided more directly via LUT output terminal MC31. The 32-bit shift out signal MC31 of LUT 1701A may also be provided to the general interconnect structure for shift register chaining, via output select multiplexer 1711D and CLE output terminal DMUX. Accordingly, the circuits and methods set forth above may be implemented in a device such as the devices of FIGS. 16 and 17, or any other suitable device.

It can therefore be appreciated that new circuits for and methods of enabling a communication channel has been described. It will be appreciated by those skilled in the art that numerous alternatives and equivalents will be seen to exist that incorporate the disclosed invention. As a result, the invention is not to be limited by the foregoing embodiments, but only by the following claims.

I claim:

1. A method of enabling a communication channel between a first communication circuit and a second communication circuit, the method comprising:
    establishing, by a control circuit, a first communication link according to a communication protocol between the first communication circuit and the second communication circuit, wherein the communication protocol enables the transmission of data between the first communication circuit and the second communication circuit at a standardized data rate;
    determining, by an error detection circuit coupled to the control circuit, the standardized data rate for which the first communication link between the first communication circuit and the second communication circuit fails to meet a predetermined quality threshold; and
    establishing, by the control circuit, a second communication link according to the communication protocol at a non-standardized data rate below the determined standardized data rate, wherein the non-standardized data rate is selected by the first communication circuit and communicated to the second communication circuit.

2. The method of claim 1 wherein establishing the first communication link according to the communication protocol at the standardized data rate comprises establishing the first communication link using a QAM protocol having data points comprising a matrix having an equal number of columns and rows in each quadrant.

3. The method of claim 2 wherein determining the standardized data rate for which the first communication link between the first communication circuit and the second communication circuit fails to meet the predetermined quality threshold comprises determining whether data transmitted at the standardized data rate fails to meet a predetermined bit error rate.

4. The method of claim 2 wherein establishing the second communication link according to the communication protocol at the non-standardized data rate comprises establishing the QAM protocol having data points having an unequal number of columns and rows in each quadrant.

5. The method of claim 1 wherein establishing the first communication link according to the communication protocol for transmitting data at the standardized data rate comprises establishing a PAM transmission having a first number of data levels that is a multiple of four for transmitting data.

6. The method of claim 5 wherein determining the standardized data rate for which the first communication link between the first communication circuit and the second communication circuit fails to meet the predetermined quality threshold comprises determining whether data transmitted at the standardized data rate fails to meet a predetermined bit error rate.

7. The method of claim 5 wherein establishing the second communication link according to the communication protocol at the non-standardized data rate comprises establishing a PAM transmission having a second number of data levels that is not a multiple of four for transmitting data.

8. The method of claim 1 wherein the first and second communication links comprise the communication links between a first die and a second die.

9. The method of claim 1 wherein the first and second communication links comprise the communication links between a first die and a second die of a multi-die integrated circuit package.

10. The method of claim 1 wherein the first and second communication links comprise the communication links between a first computer and a second computer.

11. A circuit for enabling a communication channel between a first communication circuit and a second communication circuit, the circuit comprising:
    a control circuit configured to establish a first communication link according to a communication protocol between a first communication circuit and a second communication circuit, wherein the communication protocol enables a transmission of data between the first communication circuit and the second communication circuit at a standardized data rate; and
    an error detection circuit coupled to the control circuit, wherein the error detection circuit determines the standardized data rate according to the communication protocol for which the first communication link between the first communication circuit and the second communication circuit fails to meet a predetermined quality threshold;
    wherein the control circuit establishes a second communication link at a non-standardized data rate according to the communication protocol below the determined standardized data rate, and the non-standardized data rate is selected by the first communication circuit and communicated to the second communication circuit.

12. The circuit of claim 11 wherein the control circuit enables establishing the first communication link using a QAM protocol having data points comprising a matrix having an equal number of columns and rows in each quadrant.

13. The circuit of claim 12 wherein the control circuit determines whether data transmitted at the standardized data rate fails to meet a predetermined bit error rate.

14. The circuit of claim 12 wherein the control circuit establishes a QAM protocol having data points having an unequal number of columns and rows in four quadrants.

15. The circuit of claim 11 wherein the control circuit establishes the first communication link using a PAM protocol having a first number of data levels for transmitting data that is multiple of four.

16. The circuit of claim 15 wherein the control circuit determines whether data transmitted at the standardized data rate fails to meet a predetermined bit error rate.

17. The circuit of claim 15 wherein the control circuit establishes the second communication link using a PAM protocol having a second number of data levels that is not a multiple of four for transmitting data.

18. The circuit of claim 11 wherein the first and second communication links comprise the communication links between a first die and a second die.

19. The circuit of claim 11 wherein the first and second communication links comprise the communication links between a first die and a second die of a multi-die integrated circuit package.

20. The circuit of claim 11 wherein the first and second communication links comprise the communication links between a first rack having a computer and a second rack having a computer.

* * * * *